US006929224B1

(12) United States Patent
Masuda et al.

(10) Patent No.: US 6,929,224 B1
(45) Date of Patent: *Aug. 16, 2005

(54) MULTI-HINGE SYSTEM FOR DISPLAYS

(75) Inventors: Kuni Masuda, Cupertino, CA (US); Joe Miseli, San Bruno, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/097,239

(22) Filed: Mar. 12, 2002

(51) Int. Cl.[7] ............................................. F16M 11/04
(52) U.S. Cl. ....................... 248/176.3; 248/919; 16/376
(58) Field of Search ........................ 248/917, 919–923, 248/176.3, 474, 486, 440.1, 284.1, 163.1; 361/681, 682, 683; 16/376

(56) References Cited

U.S. PATENT DOCUMENTS

| | | | |
|---|---|---|---|
| 107,191 A | * | 9/1870 | Milne ....................... 248/284.1 |
| 340,790 A | * | 4/1886 | Kochsmeier et al. ......... 16/295 |
| 3,908,581 A | | 9/1975 | Cowley |
| 4,478,382 A | | 10/1984 | Carrier |
| 4,560,132 A | | 12/1985 | Wilder |
| 4,928,914 A | * | 5/1990 | Snodell .................... 248/284.1 |
| 4,989,813 A | | 2/1991 | Kim et al. |
| 5,109,411 A | | 4/1992 | OConnell |
| 5,195,213 A | | 3/1993 | Ohgami et al. |
| 5,335,142 A | | 8/1994 | Anderson |
| 5,812,368 A | * | 9/1998 | Chen et al. .................. 361/681 |
| 5,979,562 A | | 11/1999 | Hammonds |
| 5,992,809 A | | 11/1999 | Sweere et al. |
| 6,018,847 A | * | 2/2000 | Lu .............................. 16/337 |

(Continued)

FOREIGN PATENT DOCUMENTS

DE 3228965 8/1982

(Continued)

OTHER PUBLICATIONS

"Flat Out Cool", *Time*, vol. 159, No. 2, Cover Photo, Jan. 14, 2002.

(Continued)

*Primary Examiner*—Korie Chan
(74) *Attorney, Agent, or Firm*—Meyertons Hood Kivlin Kowert & Goetzel, P.C.; B. Noël Kivlin

(57) ABSTRACT

The disclosed system is directed towards a multi-hinge. The multi-hinge comprises a body including a first end and a second end opposite the first end. The first end defines a beam axis of rotation and the second end defines a bracket axis of rotation. A bracket coupling is rotatably coupled to the second end of the body along the bracket axis of rotation. The bracket coupling includes a rotary section rotatably coupled to the second end of the body along the bracket axis and a mounting section disposed coaxially with and rotatably coupled to the rotary section. The multi-hinge includes a base rotatably coupled to the first end of the body about the beam axis of rotation. The multi-hinge further includes a moment arm pivotally coupled to the base at a radial distance from the beam axis and pivotally coupled to the rotary section of the bracket coupling at the radial distance from the bracket axis. The multi-hinge includes a torsional preloading member coupled between the body and the base.

22 Claims, 5 Drawing Sheets

U.S. PATENT DOCUMENTS

| | | | |
|---|---|---|---|
| 6,135,404 A * | 10/2000 | Wisniewski et al. | 248/281.11 |
| 6,173,934 B1 * | 1/2001 | Lin | 248/284.1 |
| 6,227,518 B1 | 5/2001 | Sun | |
| 6,244,553 B1 * | 6/2001 | Wang | 248/278.1 |
| 6,257,538 B1 * | 7/2001 | Pangborn et al. | 248/284.1 |
| 6,357,712 B1 | 3/2002 | Lu | |
| 6,366,453 B1 | 4/2002 | Wang et al. | |
| 6,367,749 B2 | 4/2002 | Valiulis | |
| 6,378,830 B1 * | 4/2002 | Lu | 248/278.1 |
| 6,382,577 B1 * | 5/2002 | McCoy et al. | 248/284.1 |
| 6,394,403 B1 | 5/2002 | Hung | |
| 6,437,975 B1 | 8/2002 | Huang | |
| 6,462,939 B1 | 10/2002 | Heirich | |
| 6,478,275 B1 * | 11/2002 | Huang | 248/284.1 |
| 6,529,369 B1 | 3/2003 | Zarek et al. | |
| 6,561,469 B1 * | 5/2003 | Masuda et al. | 248/163.1 |
| 6,575,419 B1 * | 6/2003 | Masuda et al. | 248/371 |
| 6,637,104 B1 * | 10/2003 | Masuda et al. | 29/832 |
| 6,669,164 B1 | 12/2003 | Bohman | |
| 6,713,678 B2 * | 3/2004 | Masuda et al. | 174/72 A |
| 2002/0020792 A1 | 2/2002 | Lee | |
| 2002/0053629 A1 | 5/2002 | Hokugoh | |
| 2003/0173476 A1 | 9/2003 | Masuda et al. | |
| 2003/0174259 A1 | 9/2003 | Yang | |
| 2003/0223188 A1 | 12/2003 | Ha | |

FOREIGN PATENT DOCUMENTS

| | | |
|---|---|---|
| DE | 3943137 | 12/1989 |
| GB | 2140073 A * | 11/1984 |
| WO | 01/61237 | 8/2001 |

OTHER PUBLICATIONS

J. Quittner, "Apple's New Core", *Time*, vol. 159, No. 2, pp. 46-52, Jan. 14, 2002.

* cited by examiner

MULTI-HINGE SYSTEM FOR DISPLAYS

FIELD OF THE DISCLOSURE

The present disclosure relates to the field of information display technology for electronic devices. Particularly the present disclosure relates to a visual display support device having a large range of flexibility and stability.

BACKGROUND OF THE DISCLOSURE

Information display technology has provided various forms of visual presentation for viewers. Cathode ray tubes, and liquid crystal displays (LCD) or flat panel displays are widespread and serve as the mainstay for visually displaying information. The decreased weight and size of a flat panel display greatly increases its versatility over a cathode ray tube display. The desire for a larger LCD viewing area has been satisfied with larger LCD displays.

The larger LCD display, although still lighter and thinner than its cathode ray tube counterpart, has created problems for the support devices used in conjunction with these displays. In order to accommodate the larger LCD, the support devices have become less adaptable and less flexible. The support devices have become harder to manipulate, limiting the range of adjustment, and therefore, the flexibility of use for the viewer. The support devices have become wider and thicker, occupying a larger volume of workspace proximate to the visual display. Additionally, the support devices have become less stable posing a greater safety concern near the workspace. In attempts to reduce the volume occupied by conventional support devices, reductions in the base and shifting of the center of mass of the devices renders them susceptible to toppling over when viewers attempt to adjust the display or relocate the entire unit at the workspace. The destabilized support device poses an undesirable safety concern at the workspace.

What is needed is a support device that has the capacity to support large displays while being flexible and easy to manipulate. In addition the support device needs to occupy less volume, while being stable and safe, while providing greater workspace.

SUMMARY OF THE DISCLOSED SYSTEM

The disclosed system is directed towards a multi-hinge. The multi-hinge comprises a body including a first end and a second end opposite the first end. The first end defines a beam axis of rotation and the second end defines a bracket axis of rotation. A bracket coupling is rotatably coupled to the second end of the body along the bracket axis of rotation. The bracket coupling includes a rotary section rotatably coupled to the second end of the body along the bracket axis and a mounting section disposed coaxially with and rotatably coupled to the rotary section. The multi-hinge includes a base rotatably coupled to the first end of the body about the beam axis of rotation. The multi-hinge further includes a moment arm pivotally coupled to the base at a radial distance from the beam axis and pivotally coupled to the rotary section of the bracket coupling at the radial distance from the bracket axis. The multi-hinge includes a torsional preloading member coupled between the body and the base.

DETAILED DESCRIPTION OF THE DISCLOSURE

Those of ordinary skill in the art will realize that the following description of the present disclosed system is illustrative only and not in any way limiting. Other embodiments of the disclosed system will readily suggest themselves to such skilled persons.

Support systems are mountable to visual displays for the purpose of providing multiple positions and locations for the display to be viewed while allowing comfortable, safe viewing for the viewer without occupying large volumes of workspace. The support system functions utilizing an arching brace having two wide footprints for stability. The support system couples a unique flexing member that facilitates generous degrees of freedom and adjustment of the attached display for the viewer. In addition, the support system provides the flexibility, stability and safety, while minimizing the volume it occupies. With the support system, workspace peripherals can be conveniently stowed without compromising the flexibility, stability or safety of the support system 10 at the workspace.

Figure 1:
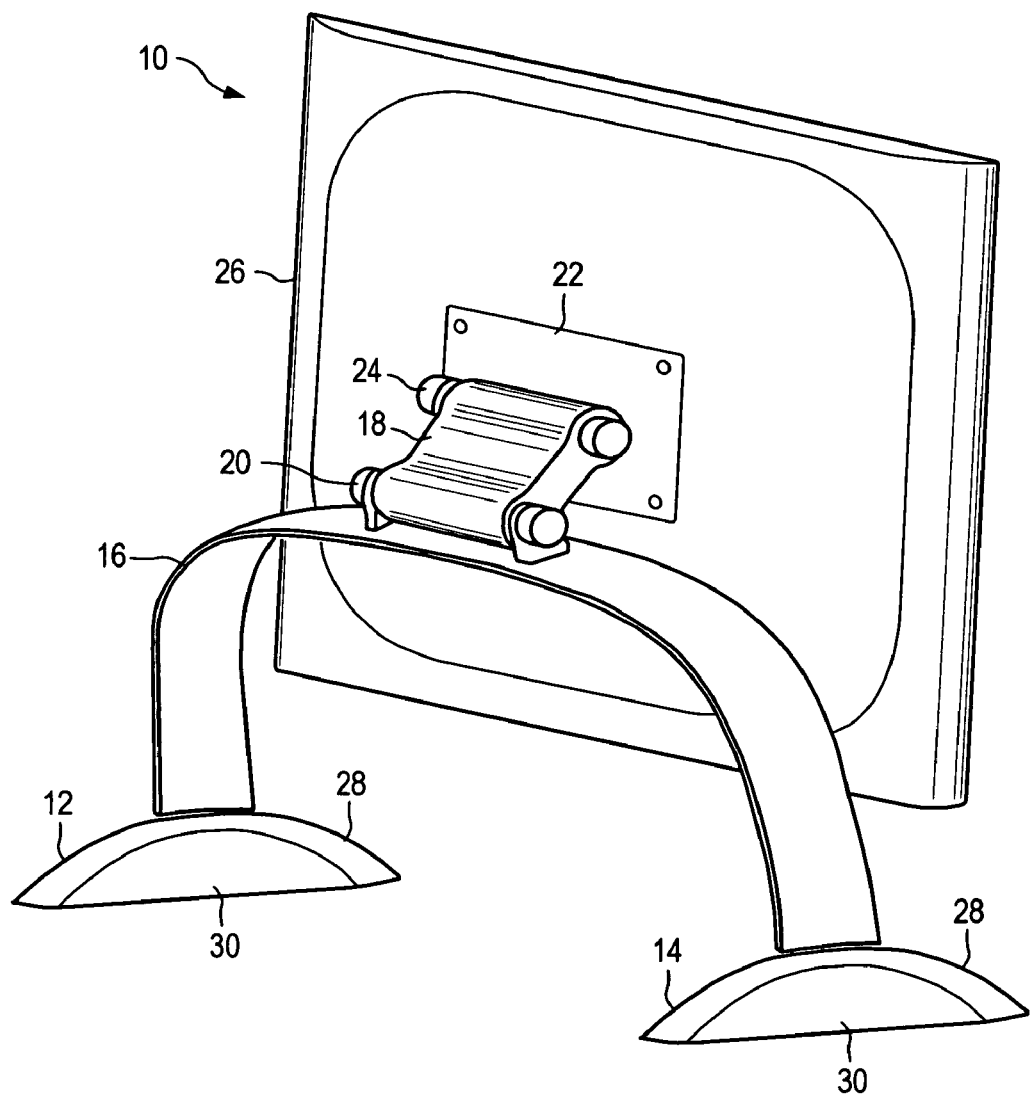
FIG. 1 is a rear prospective of an exemplary embodiment of an assembly of a support system with a display.
Figure 2:
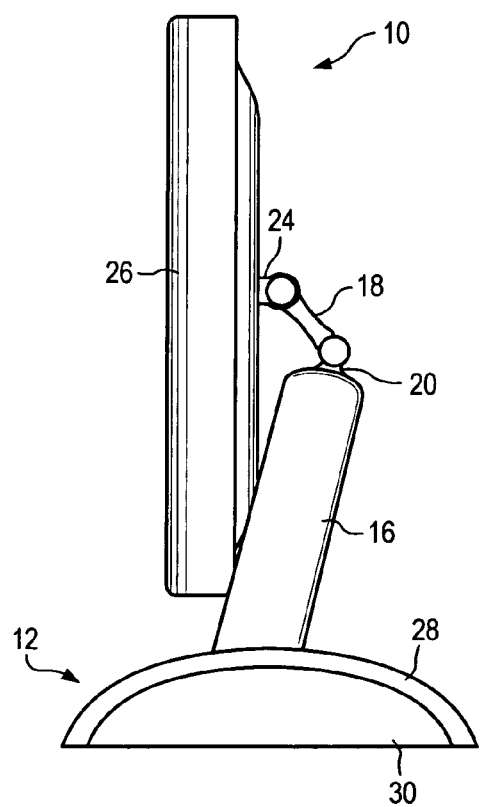
FIG. 2 is a side view of an exemplary support system.

Referring to FIGS. 1 and 2, an exemplary embodiment of a support system 10 is illustrated in a rear perspective view at FIG. 1 and a side view at FIG. 2. The support system 10 may be comprised of a pair of feet, or simply, a first base 12 and a second base 14. The first base 12 and the second base 14 are mountable to an arched beam 16. The first base 12 is mountable to one end of the arched beam 16 and the second base 14 is mountable to the other end of the arched beam 16 opposite thereof. Attached to the arched beam 16 proximate to the crest of the arch of the arched beam 16 is a flexing means or simply, a multi-hinge 18. The multi-hinge 18 is coupled to the arched beam 16 via a coupling member, or simply, a beam coupling 20 and opposite thereof, a mounting bracket 22 is coupled to the multi-hinge 18 with a coupling member or bracket coupling 24. A display 26 is mounted to the mounting bracket 22. A flat screen display is shown as display 26 in the drawings as an exemplary embodiment.

Referring still to FIGS. 1 and 2, although not explicitly shown in FIG. 2, the components referenced for first base 12 also apply to second base 14. The first and second base 12, 14 can be arched base members having an arch profile. The arched base 12, 14 includes an arch member 28 and a web 30. The arch member 28 can be a rigid, robust member. The rigid and robust qualities of the arch member 28 provide the stability and safety aspects necessary to the support system 10. Also the arch shape of the feet 12, 14 provides great strength for the given material (die cast aluminum in a preferred embodiment). The web 30 is rigid and provides greater contact surface area for the support system 10. In certain conditions, the web 30 can allow for part of the (arched base) foot 12, 14 to be suspended over an edge of a workspace surface, without a loss of stability of the support system 10 and subsequent catastrophic toppling of the display 26. The web 30 enhances the safety and stability of the support system 10.

FIG. 2 further illustrates the arched beam 16 from a side view. This view shows that the arched beam 16 is mountable to the arched bases 12, 14 proximate to the crest of the arches, thus maximizing height. The height of the arched beam 16 can depend on the size of the display. The unique arched beam 16 allows for great strength, while maximizing the capability to store or stow peripherals underneath the support system 10. The arched beam 16 can be coupled to the arched bases 12, 14 through multiple coupling techniques such as welding, bonding, threaded fasteners, and the like. In an embodiment, the arched beam 16 can be contiguous with the arched bases 12, 14. The arched beam 16 is also mountable substantially angled or tilted. The tilt positioning is away from the display 26. This arrangement enables the support system 10 to be more stable, as well as occupy less volume in a given workspace. The arched beam 16 is composed of a rigid material formed into a parabolic cross section having a thicker center and thinner edges. Other cross sections can be employed, such as a flat cross section, tear drop, annular, cylindrical, tubular, wedge, twist, and the like.

Figure 3:
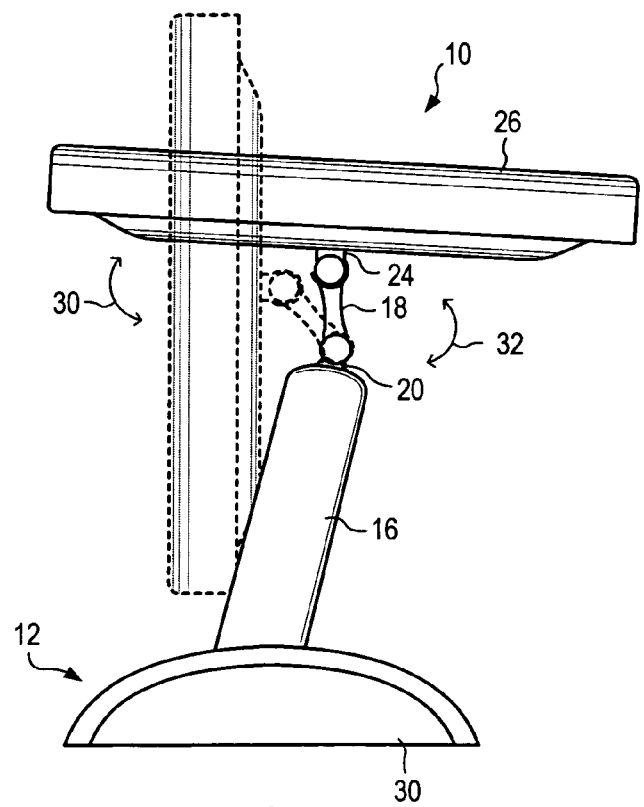
FIG. 3 is a side view of an exemplary support system in an adjusted position.

Referring now to FIGS. 1, 2 and 3 the arched beam 16 provides support for the multi hinge 18. The multi hinge 18 is mountable to the arched beam 16 near the highest point on the arch structure to provide for maximum height, while maintaining maximum stability. The multi hinge 18 includes a set of beam couplings 20 employed to mount the multi hinge 18 to the arched beam 16. A variety of fastening means can be utilized to couple the multi hinge 18 via the beam coupling 20 to the arched beam 16, such as welding, bonding, dowel and bore, fasteners and the like. The arched beam 16 and the beam coupling 20 can be contiguous in some embodiments. The multi hinge 18 is coupled to a mounting bracket 22 via a bracket coupling 24. The bracket coupling 24 can be fixed to the mounting bracket 22 through many techniques including bonding, threadable fasteners and the like. The mounting bracket 22 can be a plate substantially rectilinear having dimensions that are universally mountable to a wide variety of displays 26. While the rectilinear plate is the acceptable standard, the mounting bracket 22 can be of other shapes and structures depending on the display 26 to be mounted. The display 26 shown as a preferred embodiment, is a flat screen display with a height of 390 millimeters and width of 588 millimeters and a depth of 2.83 inches and weighing from about 30 pounds to about 45 pounds.

As illustrated in FIG. 3, the multi-hinge 18 is configured to allow for adjustment of the display 26 relative to the arched beam 16 and arched bases 12, 14. In the embodiment shown, the display 26 is adjustable on the multi-hinge 18 such that the display 26 can be substantially horizontal. The flexibility of the support system 10 can be attributed in part to the unique multi-hinge 18 having more than one degree of freedom to adjust. A first degree of rotation 30 or (tilt) can be defined as the rotation of the display 26 about the bracket coupling 24. A second degree of rotation 34 (lift) can be defined as the rotation about the beam coupling 20.

Figure 4:
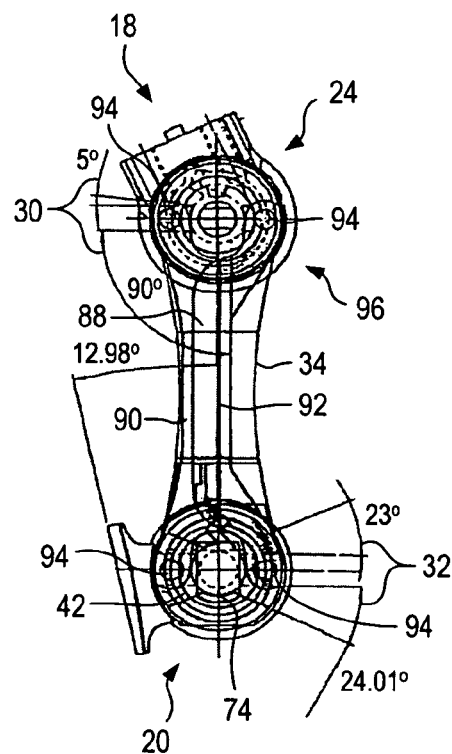
FIG. 4 is a side view of an exemplary multi-hinge.
Figure 5:
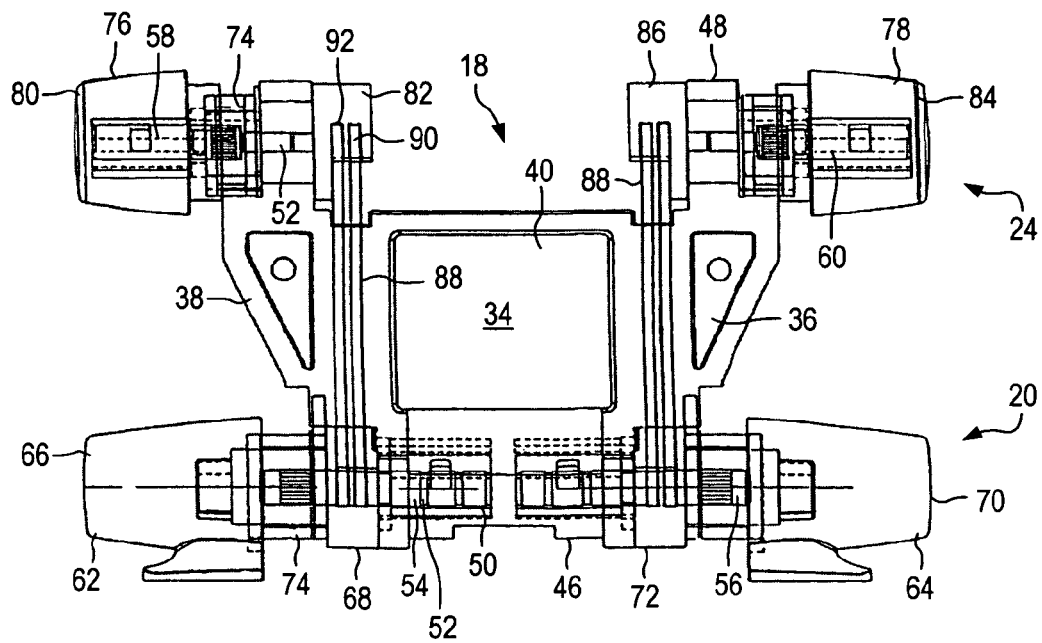
FIG. 5 is a plan view of an exemplary multi-hinge.

As illustrated in FIGS. 4 and 5 an exemplary multi-hinge 18 is shown in a plan view of FIG. 4 and a side view of FIG. 5. The multi-hinge 18 includes a hinge frame or hinge body 34. The hinge body 34, in one embodiment can comprise a webbing pattern 36 with reinforcement struts 38 forming cavities 40 in order to minimize weight while maintaining strength. At least one hard stop 42 (means for preventing rotation) can be disposed in the hinge body 34 to limit the rotation of the couplings 20, 24. In alternative embodiments, hard stops 42 can be included with the beam coupling 20, bracket coupling 24 and/or the hinge body 34 to limit the rotation of the couplings 20, 24. In a preferred embodiment, the hard stops 42 are formed in the hinge body 34 proximate the beam coupling 20 and the bracket coupling 24. The hinge body 34 further includes a first end 46 and a second end 48 opposite thereof. The hinge body 34 includes at least one bore 50 for rotatably receiving an axis of rotation such as a hinge pin 52. The hinge pin 52 is disposed through the bore 50 to provide rotary support to the beam coupling 20 disposed over the hinge pin 52 and the bracket coupling 24 disposed over the hinge pin 52. In this arrangement, there is a beam coupling axis of rotation and a bracket coupling axis of rotation. In an embodiment, there are two hinge pins 52 for the bracket coupling 24 and two hinge pins 52 for the beam coupling 20. In a preferred embodiment, there is a first beam coupling hinge pin 54, a second beam coupling hinge pin 56, which are each disposed in separate bores 50. There is a first bracket coupling hinge pin 58 and a second bracket coupling hinge pin 60, which are each disposed through separate bores 50 (shown in FIG. 5). The hinge body 34 is operatively coupled with two couplings; the beam coupling 20 and the bracket coupling 24.

The beam coupling 20 includes two beam coupling members; a first beam coupling member 62 and a second beam coupling member 64. First beam coupling member 62 is rotatably coupled to the hinge body 34 proximate to the first end 46 of the hinge body 34. The first beam coupling member 62 is disposed over the first beam coupling hinge pin 54. The first beam coupling member 62 has two sections; a mounting section 66 and a rotary section 68. The mounting section 66 is distal from the hinge body 34 and coupled to the arched beam 16. The rotary section 68 is adjacent the hinge body 34. The second beam coupling member 64 is rotatably coupled to the hinge body 34 opposite the first beam coupling member 62 and proximate to the first end 46 of the hinge body 34. The second beam coupling member 64 is disposed over the second beam coupling hinge pin 56. The second beam coupling member 64 has two sections; a mounting section 70 and a rotary section 72. The mounting section 70 is distal from the hinge body 34 and coupled to the arched beam 16. The rotary section 72 is adjacent the hinge body 34. The rotary sections 68, 72, and corresponding rotary sections 82, 86 are substantially cylindrical in shape having a substantially circular cross section.

Included with the beam coupling 20 is at least one biasing member 74. In the preferred embodiment, there are two biasing members 74; one for the first beam coupling member 62 and one for the second beam coupling member 64. In that embodiment, the first biasing member 74 is disposed over the first beam coupling hinge pin 54 and a second biasing member 74 is disposed over the second beam coupling hinge pin 56. The biasing member 74 is disposed between the mounting sections 66, 70 and the rotary sections 68, 72 for the beam coupling members 62, 64, respectively.

Still referring to FIGS. 4 and 5, the bracket coupling 24 includes two bracket coupling members; a first bracket coupling member 76 and a second bracket coupling member 78. First bracket coupling member 76 is rotatably coupled to the hinge body 34 proximate to the second end 44 of the hinge body 34. The first bracket coupling member 76 is disposed over the first bracket coupling hinge pin 58. The first bracket coupling member 76 has two sections; a mounting section 80 disposed over a rotary section 82. The mounting section 80 can rotate relative to the rotary section 82. Rotation of the rotary section 82 also rotates the mounting section 80. The mounting section 80 is distal from the hinge body 34 and coupled to the mounting bracket 22. The rotary section 82 is adjacent the hinge body 34, such that the hinge body 34 is between mounting section 80 and the rotary section 82. The second bracket coupling member 78 is rotatably coupled to the hinge body 34 opposite the first bracket coupling member 76 and proximate to the second end 44 of the hinge body 34. The second bracket coupling member 78 is disposed over the second bracket coupling hinge pin 60. The second bracket coupling member 78 has two sections; a mounting section 84 disposed over a rotary section 86. The mounting section 84 can rotate relative to the rotary section 86. Rotation of the rotary section 86 also rotates the mounting section 84. The mounting section 84 is distal from the hinge body 34 and coupled to the mounting bracket 22. The rotary section 86 is adjacent the hinge body 34, such that the hinge body 34 is between mounting section 84 and the rotary section 86.

Included with the bracket coupling 24 is at least one biasing member 74. In the preferred embodiment, there are two biasing members 74; one for the first bracket coupling member 76 and one for the second bracket coupling member 78. In that embodiment, the first biasing member 74 is disposed over the first bracket coupling hinge pin 58 and the second biasing member 74 is disposed over the second bracket coupling hinge pin 60. The biasing members 74 are disposed between the mounting section 80, 84 and the hinge body 34 inward of the bracket coupling members 76, 78.

At least one moment arm, also called connecting arm 88, is in cooperative communication between the beam coupling 20 and the bracket coupling 24. In an embodiment, a connecting arm 88 is coupled between the first beam coupling member 64 and the first bracket coupling member 76. Another connecting arm 88 is coupled between the second beam coupling member 64 and the second bracket coupling member 78. In a preferred embodiment, each connecting arm 88 comprises a first connecting arm member 90 and a second connecting arm member 92. The connecting arms 88 are coupled from each of the beam coupling member rotary sections 68, 72 to a corresponding one of the bracket coupling member rotary sections 82, 86, respectively. The connecting arm 88 cooperates between the beam coupling 20 and the bracket coupling 24. The first connecting arm member 90 may be pivotally coupled to each of the rotary sections 68, 82, respectively, via a pivotal coupling 94. Likewise, the second connecting arm member 92 may be pivotally coupled to each of the rotary sections 68, 82 respectively, via another pivotal coupling 94. In a preferred embodiment, the pivotal coupling 94 can be a threaded fastener, such as a bolt with an Allen head fitting, fastened to a respective one of the rotary sections 68, 82, 72 and 86 through one of the connecting arm members 90 and 92. It is contemplated that other forms of pivotal coupling 94 can be substituted for the above embodiment.

The rotary sections of the beam coupling and bracket coupling members 62, 64, 76, and 78 may be configured to receive both the first connecting arm member 90 and the second connecting arm member 92 in a pivotal manner as described above. In this arrangement, each connecting arm member 90, 92, having two ends opposite each other, may be pivotally coupled to a corresponding rotary section 68, 72, and opposite thereof 82, 86, respectively. Further, the pivotal couplings 94 may be spaced apart along a diameter of each rotary section 68, 72, 82, and 86. With this arrangement, the connecting arm members, 90, 92 can form a moment arm or torque 96 about the coupling hinge pins 54, 56, 58, and 60. The torque 96 may act between respective ones of the beam coupling members 62, 64 and the bracket coupling members 76, 78. The relationship of each connecting arm 88 (comprising connecting arm members 90, 92) to the torque 96 and the coupling members 62, 64, 76 and 78, is discussed further herein.

The following presents a discussion of the operational relationship and the cooperative coupling of the couplings 20, 24 and the connecting arm 88. The beam coupling 20 along with the bracket coupling 24, in one embodiment, have a range of adjustment in the first degree 30 of about −5 degrees to about 90 degrees. In other embodiments, the beam coupling 20, has a second degree of rotation 32, that is about 45 degrees of rotation and the bracket coupling has about 95 degrees of rotation. The bracket coupling 24 is independently adjustable. For example, the bracket coupling 24 can be adjusted (tilted) in order to alter the placement of the display relative to a viewer without adjusting (rotating) the beam coupling 20. Specifically, rotation of the bracket coupling mounting section 80, 84 does not rotate the bracket coupling rotary section 82, 86 and does not impart a torque 96 to the beam coupling rotary section 68, 72 via the connecting arm 88. However, the beam coupling 20 is cooperatively coupled to the bracket coupling 24 by the connecting arm 88. The beam coupling 20 can be used to adjust the height of the mounting bracket 22 relative to the arched beam 16 and ultimately to a work surface, desktop, and the like (not shown). The adjustment of the beam coupling 20 is cooperatively coupled to the bracket coupling 24 such that adjustment of the beam coupling 20 will not substantially alter the adjustment (tilt) of the display 26. As the beam coupling 20 is adjusted, (for the purpose of raising or lowering a display height from a work surface), the connecting arm 88 applies a torque to the bracket coupling 24 and rotates the bracket coupling 24 such that the tilt of a coupled display 26 is not substantially altered. Specifically, as the beam coupling mounting sections 66, 70 are rotated, the beam coupling rotary sections 68, 72 are also rotated. Since the beam coupling rotary sections 68, 72 are cooperatively coupled via the connecting arm 88 to the bracket coupling rotary sections 82, 86, then rotation of the beam coupling rotary sections 68, 72 applies the torque 96 to the bracket coupling rotary sections 82, 86. The torque 96 applied to the bracket coupling rotary sections 82, 86 rotates both the bracket coupling rotary sections 82, 86 and the bracket coupling mounting sections 80, 84. The cooperative coupling between the beam coupling 20 and the bracket coupling 24 is such that, as the hinge body 34 adjusts relative to the beam coupling mounting sections 66, 70, that are fixed to the arched beam 16, the tilt of the display 26 is maintained. Even though the hinge body orientation is changing relative to the arched beam 16, the tilt of the display is maintained due to the adjustment to the bracket coupling 24 by the beam coupling 20 through rotation of the beam coupling rotary sections 68, 72 applying the torque 96 to the bracket coupling rotary sections 82, 86. For example, if a display is mounted to the mounting bracket 22 and oriented substantially vertical, (i.e., not tilted), as well as at a height of X relative to a supporting surface, then beam coupling 20 may be adjusted in order to lower the height of the display relative to the surface, without substantially changing the orientation of display 26 relative to the viewer, other than its height from the supporting surface, and, less so, its distance from the viewer. That is, the display will not tilt.

More specifically, the relationship of the bearing coupling member rotary sections 68, 72 to the corresponding bracket coupling rotary sections 82, 86 respectively, is influenced by the first connecting arm 90 and the second connecting arm 92. For example, with respect to the first beam coupling member 62, being pivotally coupled to a first connecting arm 90 and a corresponding first bracket coupling member 76 having the same first connecting arm 90 pivotally coupled at an opposite end thereof, such that rotation of the first beam coupling member 62 imparts a force along the first connecting arm 90 to the first bracket coupling member 76. Due to the relative arrangement of the first beam coupling member 62 to the first bracket coupling member 76, the force imparted is the torque 96 about the first bracket coupling hinge pin 58. As a result of the torque 96, the first bracket coupling member 76 is rotated about the first bracket coupling hinge pin 58. The rotation of the first bracket coupling member 76 actually maintains the tilt of the display as the first beam coupling member 62 is adjusted.

This relationship is also mirrored between the first beam coupling member 62 and the first bracket coupling member 76 having the second connecting arm 92 pivotally coupled therebetween, for the opposite adjustment of the display (i.e., raising the height of the display from the work surface). The mirrored relationship exists because of the location of the pivotal coupling 94 on each rotary section being on the same diameter but opposite thereof relative to the coupling hinge pin 54, 56, 58, and 60. The connecting arm members 90, and 92 are pivotally coupled to the pivotal coupling 94 opposite each other for each rotary section on each coupling member 62, 64, 76, and 78 (see FIG. 4).

It is understood that the relationship herein described between the first beam coupling member 62 and the first bracket coupling member 76 is also conceptually true for the cooperative coupling between the second beam coupling member 64 and the second bracket coupling member 78 respectively, as well as the cooperative coupling between the beam coupling 20 and the bracket coupling 24.

Figure 8:
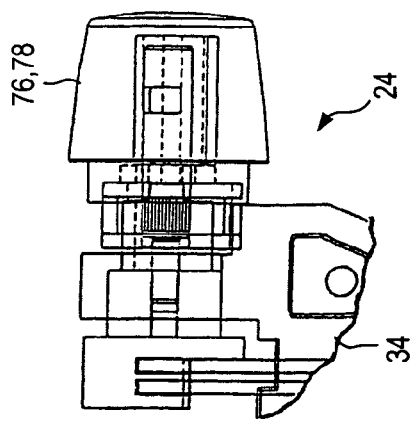
FIG. 8 is a combination plan view and side view of an exemplary coupling element on a multi-hinge, in a degree of rotation.
Figure 8:
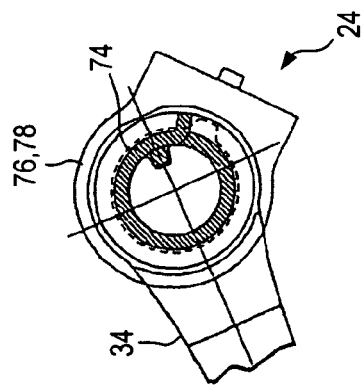
Figure 7:
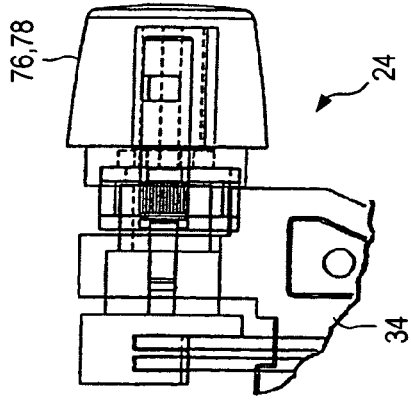
FIG. 7 is a combination plan view and side view of an exemplary coupling on a multi-hinge, in a degree of rotation.
Figure 7:
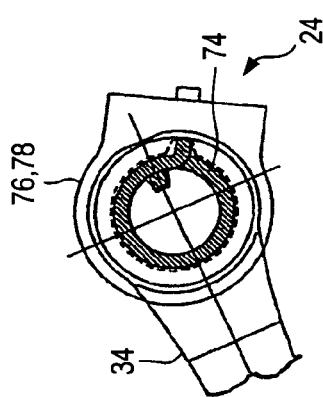
Figure 6:
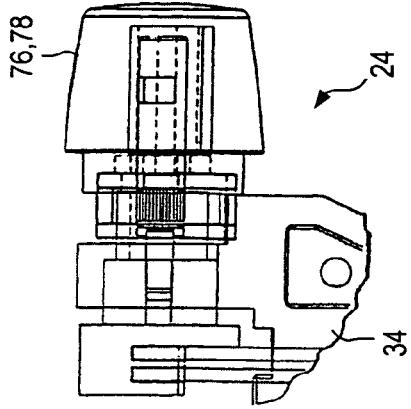
FIG. 6 is a combination plan view and side view of an exemplary coupling on a multi-hinge, in a degree of rotation.
Figure 6:
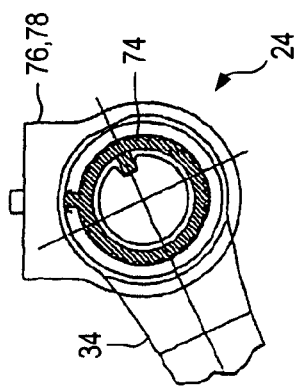

Referring to FIGS. 6, 7 and 8, an exemplary embodiment of the bracket coupling 24 is illustrated as a plan and a side view in various stages of articulation. As discussed above, the beam coupling 20 and the bracket coupling 24 can be rotated about their associated beam and bracket coupling hinge pins 54, 56, 58 and 60. FIGS. 6, 7, and 8 show more detail as well as a biasing member 74 disposed in the bracket coupling 24. A biasing member 74 is also disposed in the beam coupling 20 (not shown). It is contemplated that multiple biasing members 74 can be employed and that the biasing members 74 can have varying degrees of strength (spring constants). The biasing member 74 can be preloaded such that the beam coupling 20 can hold the hinge body 34 in a predetermined position (e.g., at a 45 degree angle). Upon placement of a load such as the weight of a display 26, the multi-hinge 18 can support the display in an orientation that is comfortable for a viewer. The biasing member 74 can be employed to provide resistance for the tilt adjustment about the bracket coupling 24. FIGS. 5, 6 and 7 illustrate the range of rotation of the bracket coupling 24. The about 90 degrees of rotation is shown between FIG. 6 and FIG. 8. This rotation is relative to the hinge body 34. Biasing member 74 biases (provides a spring force or any resistive force opposite to the torsional forces created by the weight of components, viewers manual inputs for adjustments, and the like) the beam and bracket couplings 20, 24 in order to allow for rotation of the beam and bracket couplings 20, 24 with resistive control. It is contemplated that biasing members 74 are not the only components that can provide resistance to adjustment as discussed hard stops, and even tight tolerances between moving parts can be employed.

Figure 9:
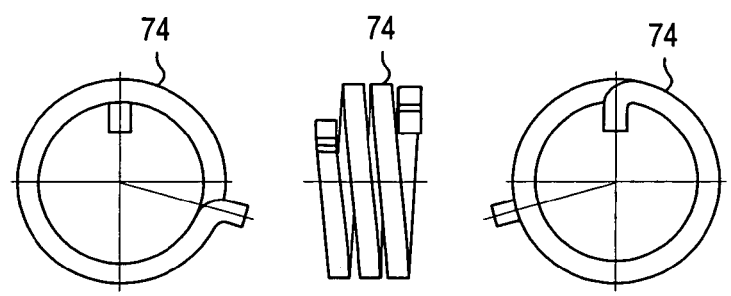
FIG. 9 is a combination of views of an exemplary biasing member.

Referring to FIG. 9, an exemplary embodiment of the biasing member 74 is illustrated in three views, a front, a back and a side view. The biasing member 74 can be known as a beam biasing member and/or a bracket biasing member. The biasing member 74 in the embodiment shown is a torsion spring configuration. There can be other configurations of the biasing member as well, such as a torsion element, friction rings, and the like. The torsion spring can couple with the hinge body 34 and the coupling members 62, 64, 76, and 78, as well as accommodate the coupling hinge pins 54, 56, 58 and 60 within a minimal area. The biasing member 74 can maintain the relationship between the hinge body 34 and the couplings 20, 24 even with a mounted load, such as a display. Additionally, the biasing member 74 in cooperation with the couplings 20, 24 can be manually manipulated lithly to allow for multiple degrees of adjustment between the couplings 20, 24 and the hinge body 34.

Figure 10:
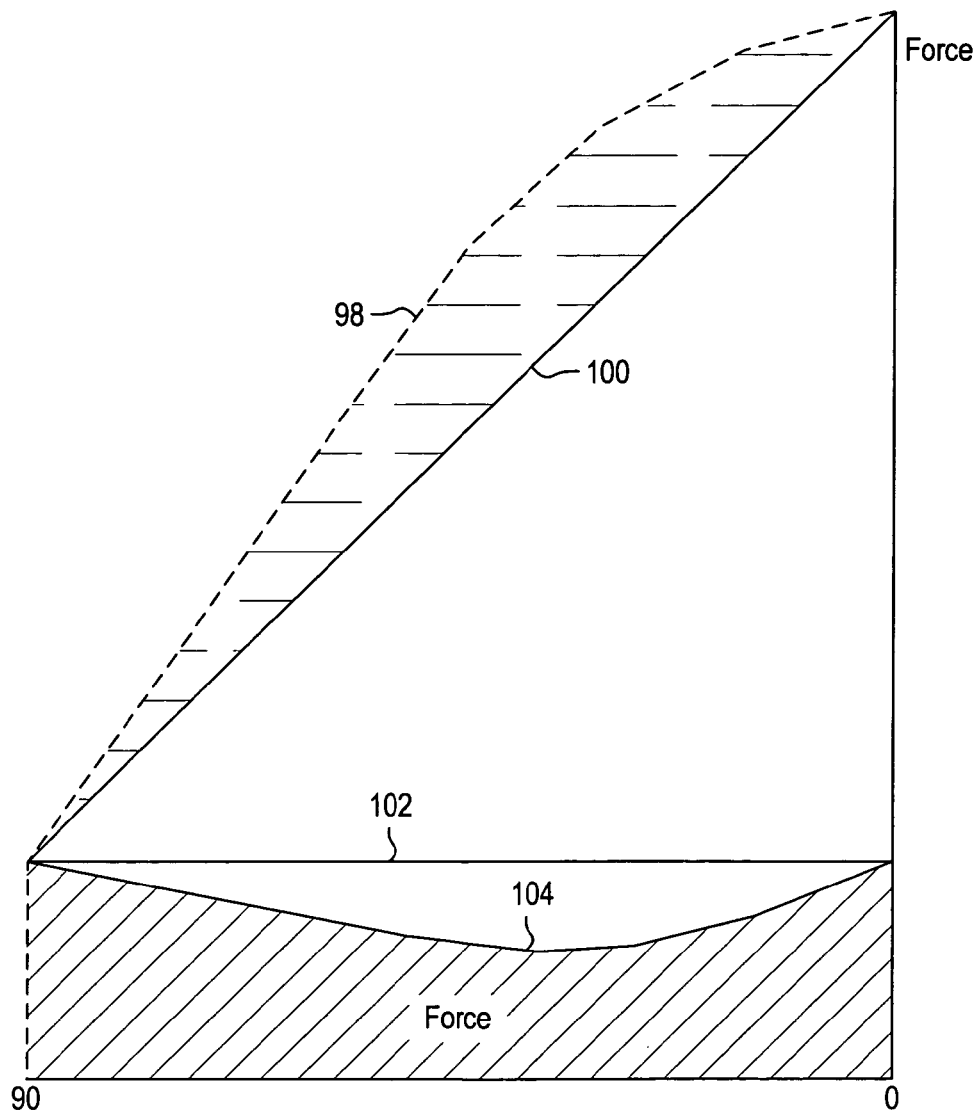
FIG. 10 is a force diagram for an exemplary embodiment of the multi-hinge.

Referring to FIG. 10, a force diagram illustrates the features of the support system 10. The line represented by numeral 98 is the weight of the display. The line represented by numeral 100 is the torsion s/p torque line. The line represented by numeral 102 is the friction force for the multi-hinge 18. The line represented by numeral 104 is the actual force. The multi-hinge 18 allows for adaptable adjustment of the display 26 with very supple manipulation by a viewer. Additionally, the multi-hinge 18 provides a range of motion that allows for a wide variety of use from any type of screen attached to the support system 10. For example, in one embodiment, the force to manipulate a display mounted to the support system 10 having multi-hinge 18 can be as follows: a force to move the display rearward can be from about 3.0 kilograms of force to about 4.0 kilograms of force; and the force to move the display forward can be from about 2.5 kilograms of force to about 3.5 kilograms of force; to translate the display about the beam coupling a distance of from about 12 centimeters to about 9.5 centimeters with no tilting, about 130 kilograms centimeter of force are required at the bracket coupling and about 75 kilograms centimeter of force are required. The multi-hinge 18 can be varied by altering tolerances and the biasing member spring constant as well as the configuration.

While embodiments and applications of this disclosure have been illustrated and described, it would be apparent to those skilled in the art that many more modifications than mentioned above are possible without departing from the inventive concepts herein. The disclosure, therefore, is not to be restricted except in the spirit of the appended claims.

What is claimed is:
1. A multi-hinge comprising:
   a body including a first end and a second end opposite said first end, said first end defining a beam axis of rotation and said second end defining a bracket axis of rotation,
   a bracket coupling rotatably coupled to said second end of said body along said bracket axis of rotation, said bracket coupling comprising a rotary section rotatably coupled to said second end of said body along said bracket axis and a mounting section disposed coaxially with and rotatably coupled to said rotary section and to said body, whereby rotation of said mounting section is permitted relative to said body and relative to said rotary section, and said rotary section is permitted to rotate said mounting section around said bracket axis;

a base rotatably coupled to said first end of said body about said beam axis of rotation;
a moment arm pivotally coupled to said base away from said beam axis and pivotally coupled to said rotary section of said bracket coupling away from said bracket axis; and
a torsional preloading member coupled between said body and said base.

2. The multi-hinge as in claim 1 further comprising:
an opposing moment arm pivotally coupled to said base away from said beam axis opposite said moment arm and pivotally coupled to said rotary section of said bracket coupling away from said bracket axis at a point 180 degrees opposite said moment arm, whereby said beam axis and said bracket axis are interposed between said moment arm and said opposing moment arm.

3. The multi-hinge of claim 1 further comprising:
a hard stop coupled to said body and said base.

4. The multi-hinge of claim 1 wherein said torsional preloading member is a torsion spring.

5. The multi-hinge of claim 1 wherein said base is an arched beam.

6. The multi-hinge of claim 5 wherein said base is adapted to be disposed on a workspace surface.

7. The multi-hinge of claim 1 coupled to a display.

8. The multi-hinge of claim 7 coupled to a mounting bracket.

9. The multi-hinge of claim 1, wherein said body is substantially planar having at least one strut structured to form webbing for making said hinge body rigid.

10. The multi-hinge of claim 1, further comprising:
a second bracket coupling rotatably coupled to said second end of said body opposite said bracket coupling along said bracket axis of rotation, said second bracket coupling including a second rotary section rotatably coupled to said second end of said body along said bracket axis; and
a second mounting section rotatably coupled to said second rotary section coaxially with said rotary section.

11. The multi-hinge of claim 1, further comprising:
a bore defined in said body along said bracket axis of rotation at said second end of said body;
a hinge pin rotatably disposed in said bore;
a first biasing member disposed over said hinge pin between said mounting section of said bracket coupling and said bore of said body.

12. The multi-hinge of claim 1, wherein said beam axis of rotation is substantially parallel to said bracket axis of rotation.

13. The multi-hinge of claim 1, wherein said base comprises a beam coupling rotatably coupled to said first end of said body along said beam axis of rotation, said beam coupling including a rotary section rotatably coupled to said first end of said body along said beam axis of rotation, and a mounting section coupled to said rotary section being mutually rotatable with said rotary section.

14. The multi-hinge of claim 13, wherein said moment arm is pivotally coupled to said rotary section of said beam coupling away from said beam axis of rotation.

15. The multi-hinge of claim 13, further comprising an opposing moment arm pivotally coupled to said rotary section of said beam coupling at a pivotal coupling disposed on said rotary section away from said beam axis.

16. The multi-hinge of claim 13, wherein said base comprises a second beam coupling rotatably coupled to said first end of said body opposite said beam coupling along said beam axis of rotation, said second beam coupling comprising a second rotary section rotatably coupled to said first end of said body along said beam axis of rotation; and
a second mounting section coupled to said second rotary section being mutually rotatable with said rotary section.

17. The multi-hinge of claim 16, wherein a second moment arm is pivotally coupled to said rotary section of said second beam coupling away from said beam axis of rotation.

18. The multi-hinge of claim 16, further comprising a second opposing moment arm pivotally coupled to said rotary section of said second beam coupling at a pivotal coupling disposed on said rotary section away from said beam axis.

19. A multi-hinge comprising:
a body including a first end and a second end opposite said first end, said first end defining a beam axis of rotation and said second end defining a bracket axis of rotation,
a bracket coupling rotatably coupled to said second end of said body along said bracket axis of rotation, said bracket coupling including a rotary section rotatably coupled to said second end of said body along said bracket axis and a mounting section disposed coaxially with and rotatably coupled to said rotary section;
a base rotatably coupled to said first end of said body about said beam axis of rotation;
a means for pivotally coupling being pivotally coupled to said base away from said beam axis and being pivotally coupled to said rotary section away from said bracket axis; and
a means for torsionally preloading between said body and said base.

20. The multi-hinge of claim 19 wherein said means for pivotally coupling includes at least one connecting arm pivotally coupled to said rotary section and said base.

21. The multi-hinge of claim 19 wherein said means for torsionally preloading between said body and said base includes a torsion spring coupled between said body and said base.

22. The multi-hinge of claim 19 wherein said base is a beam coupling.

* * * * *